(12) United States Patent
Hasaka et al.

(10) Patent No.: US 6,764,422 B2
(45) Date of Patent: Jul. 20, 2004

(54) METHOD OF BONDING AN ETHYLENE•α-OLEFIN RUBBER COMPOSITION AND A FIBER AND A POWER TRANSMISSION BELT MADE USING THE METHOD

(75) Inventors: Hitoshi Hasaka, Kobe (JP); Keiji Takano, Kobe (JP); Takashi Kinoshita, Takasago (JP)

(73) Assignee: Mitsuboshi Belting Ltd. (JP)

( * ) Notice: Subject to any disclaimer, the term of this patent is extended or adjusted under 35 U.S.C. 154(b) by 0 days.

(21) Appl. No.: 10/351,728

(22) Filed: Jan. 27, 2003

(65) Prior Publication Data

US 2003/0180516 A1 Sep. 25, 2003

Related U.S. Application Data

(62) Division of application No. 09/746,254, filed on Dec. 21, 2000, now Pat. No. 6,524,417.

(30) Foreign Application Priority Data

Dec. 25, 1999 (JP) .......................... 11/355640
Jun. 19, 2000 (JP) .......................... 2000/182360

(51) Int. Cl.⁷ .......................................... F16G 1/00
(52) U.S. Cl. ........................... 474/263; 474/237

(58) Field of Search ........................... 156/137, 138, 156/139; 474/204, 237, 255, 263, 268

(56) References Cited

U.S. PATENT DOCUMENTS

| | | | | |
|---|---|---|---|---|
| 5,354,828 A | * | 10/1994 | Kawasaki et al. | 526/125.3 |
| 5,610,217 A | * | 3/1997 | Yarnell et al. | 524/397 |
| 5,711,734 A | * | 1/1998 | Shioyama et al. | 474/260 |
| 5,891,561 A | * | 4/1999 | Kinoshita et al. | 428/295.1 |
| 5,922,823 A | * | 7/1999 | Sagane et al. | 526/336 |
| 6,176,799 B1 | * | 1/2001 | Kinoshita et al. | 474/237 |
| 6,294,600 B1 | * | 9/2001 | Takada et al. | 524/105 |

FOREIGN PATENT DOCUMENTS

EP 0552946 * 7/1993 .......... C08F/210/18

* cited by examiner

Primary Examiner—David A. Bucci
Assistant Examiner—Vicky A. Johnson
(74) Attorney, Agent, or Firm—Wood, Phillips, Katz, Clark & Mortimer

(57) ABSTRACT

A method of bonding an ethylene•α-olefin rubber composition with a fiber material. The method includes the steps of adhesion treating the fiber material with a resorcinol-formalin-rubber latex with an ethylene•α-olefin elastomer latex and vulcanization bonding the adhesion-treated fiber material together with an unvulcanized ethylene•α-olefin rubber composition.

8 Claims, 5 Drawing Sheets

METHOD OF BONDING AN ETHYLENE•α-OLEFIN RUBBER COMPOSITION AND A FIBER AND A POWER TRANSMISSION BELT MADE USING THE METHOD

This application is a Divisional of Ser. No. 09/746,254 filed on Dec. 21, 2000 now U.S. Pat. No. 6,524,417.

BACKGROUND OF THE INVENTION

1. Field of the Invention

This invention relates to power transmission belts and, more particularly, to a method of bonding an ethylene•α-olefin rubber composition and a fiber for use in a power transmission belt. The invention also relates to a power transmission belt resulting from the practice of the method.

2. Background Art

Increasing demand for energy saving has led to more compact automotive designs. Engine compartments have become increasingly smaller, as a result of which the engines are required to operate in relatively high temperature environments. Power transmission belts used on these engines are required to perform reliably in these high temperature environments.

Heretofore, natural rubber, styrene-butadiene rubber, and chloroprene rubber have been used predominantly in the construction of power transmission belts. These rubbers, used in a compression rubber layer of a power transmission belt, are prone to cracking prematurely when they are operated in high temperature environments, such as in confined automobile engine compartments.

To address this problem of premature failure, studies have been undertaken to improve the heat resistance of chloroprene rubber. Ethylene•α-olefin elastomers, such as ethylene-propylene rubber (EPR) and ethylene-butadiene-diene rubber (EPDM), have recently been proposed for use in power transmission belts in place of chloroprene rubber. These polymers are desirable in that they exhibit good heat and cold resistance and are generally economical to use. Use of these polymers is disclosed, for example, in Japanese Unexamined Patent Application No. 6-345948.

However, EPR has a relatively low tear strength, which may decrease even further in a peroxide vulcanization system. These belts are prone to popping out during operation. On the other hand, with a sulfur vulcanization system, it may be difficult to impart a sufficient degree of vulcanization to the rubber, as a result of which the belt may wear significantly during operation. This wear is particularly a problem when using a V-ribbed belt construction in which dust accumulates at the bottom of pulley recesses between adjacent ribs. This may result in tack wear which may in turn account for significant, unwanted noise generation. To increase the degree of vulcanization, EPDM with a very high number of double bonds in the molecules may alleviate tack wear to a certain extent. However, at the same time, it tends to reduce heat resistance of the rubber.

Another problem in the power transmission belt art relates to the bonding of an ethylene•α-olefin elastomer with a fiber cord. It is known, as disclosed in Japanese Unexamined Patent Application Publication No. 8-113657, to immersion treat a fiber material with a dipping solution made up of a resorcinol-formalin-styrene-butadiene-vinyl pyridine latex which is vulcanization bonded to an EPDM rubber composition. It is also known, as disclosed in Japanese Unexamined Patent Application Publication No. 8-113656, to adhesion treat fiber with a solution made up of a resorcinol-formalin rubber latex. The fiber is then vulcanization-bonded to an EPDM rubber composition made up of a methylene donor, a methylene acceptor, and a silicic acid compound.

While using a dipping solution of a resorcinol-formalin-styrene-butadiene-vinyl pyridine latex to treat the fiber material results in improved bonding strength, it may compromise other performance characteristics. With the fiber material used in load carrying cords in a transmission belt, repeated flexing may cause the load carrying cords to prematurely peel from the rubber layer in which they are embedded. This may also be true of fiber material treated with an EPDM rubber composition made up of a methylene donor, a methylene acceptor, and a silicic acid compound, when the fiber material is used in a power transmission belt as a component which is repeatedly flexed.

Because of environmental concerns, ethylene•α-olefin rubber compositions have been preferred as polymers because they contain little or no pollutant. As a result, various ethylene•α-olefin rubber compositions have been used. However, most of these compositions contain a halogenated polymer, which is an environmental pollutant. In view of this problem, there has been a demand for a method of bonding a halogenated polymer-free ethylene•α-olefin rubber composition to a fiber material.

SUMMARY OF THE INVENTION

In one form, the invention is directed to a method of bonding an ethylene•α-olefin rubber composition with a fiber material. The method includes the steps of adhesion treating the fiber material with a resorcinol-formalin-rubber latex with an ethylene•α-olefin elastomer latex and vulcanization bonding the adhesion-treated fiber material together with an unvulcanized ethylene•α-olefin rubber composition.

The method may further include the step of overcoat treating the adhesion treated fiber material with a rubber adhesive solution prepared by dissolving an unvulcanized ethylene•α-olefin rubber composition in a solvent before vulcanization bonding.

In one form, the sum of the diene content in ethylene•α-olefin rubber used for the resorcinol-formalin-rubber latex and the diene content in ethylene•α-olefin rubber used for the overcoat treating solution is at least 15%.

In one form, the solid pickup of the overcoat treating solution is within the range of 1–12% by weight.

The method may further include the step of adhesion treating the fiber material with a pre-treating solution made up at least one of (a) an isocyanate compound and (b) an epoxy compound before adhesion treating the fiber material with the resorcinol-formalin-rubber latex.

The method may further include the step of overcoat treating the fiber material with a rubber adhesive solution prepared by dissolving an ethylene•α-olefin rubber composition in a solvent before the vulcanization bonding step.

The method may further include the step of overcoat treating the fiber material with a solution prepared by adding 5–30% by weight of carbon black to a resorcinol-formalin-rubber latex consisting of an ethylene•α-olefin elastomer latex before the vulcanization bonding step.

In one form, the molar ratio of resorcinol to formalin is within the range of 1:2 to 2:1 in the resorcinol-formalin-rubber latex. The mass ratio of resorcinol-formalin precondensate to rubber latex may be within the range of 1:2 to 1:8 in the overall solid content.

The method may further include the step of incorporating the fiber material into a power transmission belt.

The fiber material may be a load carrying element, such as a load carrying layer or cord.

The invention is also directed to a power transmission belt having a body with a length. The body has a fiber material extending lengthwise of the belt body, with the fiber material being adhesion-treated with a resorcinol-formalin-rubber latex consisting of an ethylene•α-olefin elastomer latex. The fiber material may thereafter be vulcanization bonded together with an unvulcanized ethylene•α-olefin rubber composition.

The fiber material may be a load carrying element, such as a cord.

The fiber material may be embedded in a rubber layer consisting of an ethylene•α-olefin elastomer.

The fiber material may be overcoat treated with a rubber adhesive solution prepared by dissolving an unvulcanized ethylene•α-olefin rubber composition in a solvent.

In one form, the sum of the diene content in ethylene•α-olefin rubber used for the resorcinol-formalin-rubber latex and the diene content in ethylene•α-olefin rubber used for the rubber adhesive solution is not less than 15% by weight.

In one form, the ethylene•α-olefin rubber composition consists of at least one of (a) a rubber derivable from an ethylene-propylene-diene monomer and (b) EPR.

The fiber material may be at least one of (a) polyester fiber, (b) polyethylene terephthalate fiber, and (c) polyethylene naphthalate fiber.

DETAILED DESCRIPTION OF THE DRAWINGS

Figure 1:
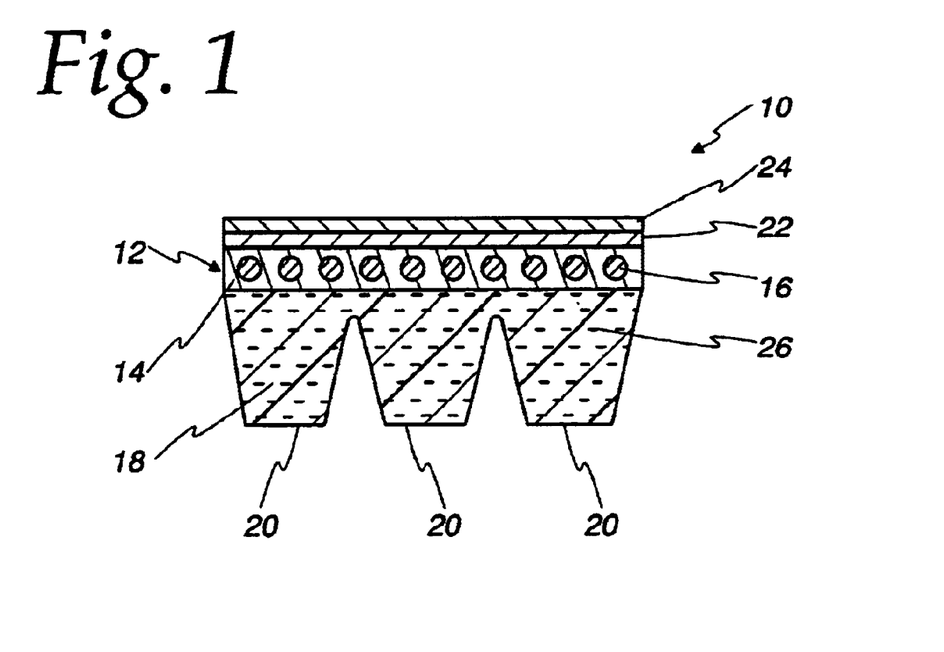
FIG. 1 is a cross-sectional view of a V-ribbed belt with fiber material therein treated according to the present invention.

In FIG. 1, a V-ribbed belt is shown at 10 and is but one example of an environment for practicing the present invention. The belt 10 consists of a body 12. The body 12 has a bonding rubber layer 14 within which fiber material, in the form of load carrying cords 16, is embedded. The load carrying cords 16 are spaced laterally of the belt body 12 and extend endlessly in a lengthwise direction within the body 12. The load carrying cords 16 are made from a twisted yarn formed to produce a high strength, low elongation construction. The load carrying cords 16 are formed and treated in accordance with the present invention, as described in greater detail below. A compression elastomer-rubber layer 18 is disposed on the inside of the bonding rubber layer 14 and has a plurality, and in this case three, V-shaped ribs 20 formed therein. Rubberized canvas layers 22, 24 are applied to the outside of the bonding rubber layer 14. Optional, laterally extending, reinforcing fibers 26 are embedded in the compression elastomer rubber layer 18. The reinforcing fibers 26, 40 may be made from aramid, nylon, polyester, vinyl or cotton, in an amount within the range of 1 to 50 parts by weight, and more preferably 5 to 25 parts by weight, per 100 parts by weight of ethylene•α-olefin elastomer.

Figure 2:
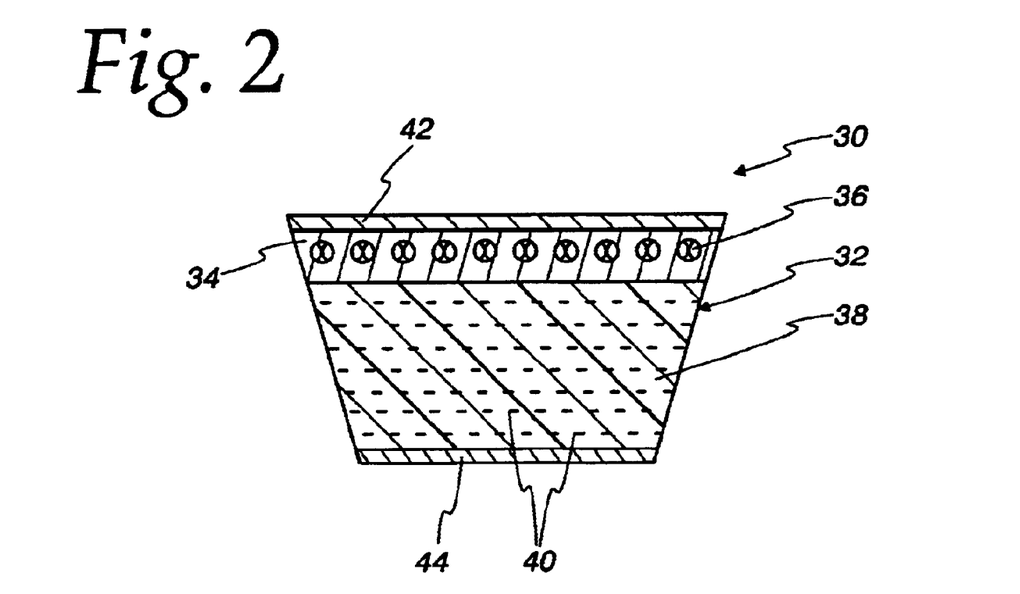
FIG. 2 is a cross-sectional view of a V-belt with fiber material therein treated according to the present invention.

FIG. 2 shows another example of a belt, in this case a V-belt 30, made according to the present invention. The V belt 30 consists of a body 32 with a bonding rubber layer 34 into which fiber material, in the form of load carrying cords 36, is embedded. An elastomer layer, in this case a compression rubber layer 38, is disposed on the inside of the bonding rubber layer 34 and has optional, laterally extending, reinforcing fibers 40 embedded therein. Rubberized canvas layers 42, 44 are respectively disposed on the outside of the bonding rubber layer 34 and inside of the compression rubber layer 38. Cogs (not shown) may be formed at spaced intervals along the length of the belt body 32 in the compression rubber layer 38.

It should be understood that the belts 10, 30 disclosed are merely exemplary of the many different belt constructions that can be made according to the present invention. The fiber material, shown in the form of load carrying cords 16, 36, could take another form, such as a fabric layer, which may perform a load carrying function.

The rubber composition usable with the fiber material, according to the present invention, is ethylene•α-olefin rubber composition. A typical composition is EPDM, that is a rubber derivable from an ethylene-propylene-diene monomer. Examples of the diene monomer are dicyclopentadiene, methylene norbornene, ethylidene norbornene, 1,4-hexadiene, cyclooctadiene, and the like. EPR may also be used.

To vulcanize the above rubbers, sulfur or organic peroxide may be used. Suitable organic peroxides are: dicumyl peroxide; di-t-butyl peroxide; t-butylcumyl peroxide; benzoyl peroxide; 1,3-bis(t-butyle-peroxyisopropyl)benzene; 2,5-dimethyl-2,5-di-(t-butylperoxy)-hexane-3; 2, 5-dimethyl-2, 5-(benzylperoxy)hexane; 2,5-dimethyl-2,5-mono (t-butylperoxy) hexane; and the like. These organic peroxides may be used alone or in combination in a mixture in an amount of 0.005 to 0.02 g by mol based on 100 g of an ethylene•α-olefin elastomer.

A vulcanization aid/co-agent can be used to increase the degree of vulcanization to reduce the problem of tack wear, and the like. Suitable co-agents for use in peroxide vulcanization are TIAC, TAC, 1,2-polybutadiene, metal salts of unsaturated carboxylic acid, oximes, guanidine, trimethylolpropane trimethacrylate, ethylene glycol dimethacrylate, N—N'-m-phenylene bismaleimide, sulfur, and the like. Other co-agents commonly used for peroxide vulcanization are also contemplated.

Other additive may be used as desired. For example, reinforcements such carbon black and silica, filler such as calcium carbonate and talc, plasticizers, stabilizers, processing aids, and colorants that are conventionally used in rubber compositions, may be employed.

The fiber material in the load carrying cords 16, 36, or a woven cloth, may be made from aramid fiber or polyester fiber such as polyethylene terephthalate fiber (PET fiber) or polyethylene naphthalate fiber (PEN fiber).

The fiber material used in the present invention may be treated by a number of different methods, as described below. The treatment is not limited to these methods.

(a) The fiber material may be adhesion treated with RFL consisting of an ethylene•α-olefin elastomer latex.

(b) The fiber material may be treated with a pretreating solution consisting of an isocyanate compound and/or an epoxy compound and then adhesion treated with RFL consisting of an ethylene•α-olefin elastomer latex.

(c) The fiber material may be adhesion treated with a pretreating solution consisting of an isocyanate compound and/or epoxy compound, adhesion treated with RFL consisting of an ethylene•α-olefin elastomer latex, and overcoat treated with a rubber adhesive prepared by dissolving an ethylene•α-olefin rubber composition in a solvent, or with a solution prepared by adding 5 to 30% by weight of carbon black to RFL consisting of an ethylene•α-olefin elastomer latex.

(d) The fiber material may be adhesion treated with RFL consisting of an ethylene•α-olefin elastomer latex, followed by overcoat treating with a rubber adhesive prepared by dissolving an ethylene•α-olefin rubber composition in a solvent.

(e) The fiber material may be treated with a pretreating solution consisting of an isocyanate compound and/or an epoxy compound and then adhesion treated with RFL consisting of an ethylene•α-olefin elastomer latex, followed by overcoat treating with a rubber adhesive prepared by dissolving an ethylene•α-olefin rubber composition in a solvent.

The RFL may be a mixture of resorcinol-formalin pre-condensate and an ethylene•α-olefin elastomer latex rubber. The molar ratio of resorcinol to formalin is preferably set to be within the range 1:2 to 2:1 so as to provide good bond strength. If the molar ratio is less than 1:2, the resorcinol-formalin resin may undergo an excessive tridimensional reaction so as to cause gelation. If the molar ratio is more than 2:1, the reaction between the resorcinol and formalin may not effectively occur with a potential reduction in bond strength resulting.

The ethylene•α-olefin elastomer latex rubber may be an ethylene-propylene-diene monomer latex. Examples of the diene monomer are dicyclopentadiene, methylene norbornene, ethylidene norbornene, 1,4-hexadiene, cyclooctadiene, and the like.

The sum of the content of a diene used in RFL and the content of a diene used in the overcoat treating solution consisting of an ethylene•α-olefin rubber is preferably not less than 15% by weight. If the sum is less than 15% by weight, insufficient bond strength between the fiber material and the rubber may result. This may result in poor bonding between the fiber material and the bonding rubber layers 14, 34, particularly during operation of the belt. The result may be premature peeling and protrusion of the fiber material, which is either the load carrying cords 16, 36, a cloth layer, or other load carrying element.

In the ethylene•α-olefin rubber, the diene content is such that the ethylene content (% by weight), the propylene content (% by weight), and the diene content (percent by weight) total 100% by weight.

The overcoat treating solution should have a solid pickup within the range of 1 to 12% by weight. Departures from this range may result in inadequate bonding between the fiber material and the rubber, particularly between the load carrying cords 16, 36 and the bonding rubber layers 14, 34. This may produce premature peeling and protrusion of the load carrying cords 16, 36 from the bonding rubber layers 14, 34.

Synthetic rubber latex may be produced in two different ways. In one process, a solid polymer is dissolved in a solvent, with the resulting polymer solution subjected to phase inversion so as to emulsify and disperse the same in water, thereby producing latex. In another process, an emulsified monomer is polymerized directly into a latex. Although an ethylene-propylene-diene monomer latex produced by the former process has been used in the examples, described below, those produced by the latter process are acceptable as well.

The mass ratio of resorcinol-formalin precondensate to rubber latex is preferably within the range of 1:2 to 1:8 in the overall solid content. This range is generally conducive to good bond strength. Mass ratios of less than 1:2 may result in too large a content of resorcinol-formalin resin, which could result in a hard RFL film and a low level of dynamic bondability. On the other hand, mass ratios of more than 1:8 may result in too small a resorcinol-formalin resin content. This may produce a soft RFL film with an unacceptable decrease in bond strength.

In the treatment, the temperature of the treating solution is adjusted to 5 to 40° C., with immersion time being in the range of 0.5 to 30 seconds. Heat treatment is carried out by passage of a fiber material for 1 to 3 minutes through an oven at a temperature of 200 to 250° C.

In the pretreatment process, an untreated fiber material is immersed for 0.5 to 30 seconds in a treating solution made up of an isocyanate compound and/or an epoxy resin at room temperature. The fiber material is then dried by passage for 2 to 5 minutes through an oven at a temperature of 150 to 190° C.

The isocyanate compound used in the pretreating solution may be, for example, 4,4'-diphenylmethane diisocyanate, toluene 2,4-diisocyanate, polymethylene polyphenyl diisocyanate, hexamethylene diisocyanate, polyaryl polyisocyanate (a suitable product available commercially is sold under the trademark PAPI), and the like. The isocyanate compound may be used in mixture with an organic solvent such as toluene, methyl ethyl ketone, or the like.

A blocked polyisocyanate may also be used. This may be derived by reacting the above isocyanate compound with a blocking agent such as phenol, a tertiary alcohol, a secondary alcohol, or the like, so that the isocyanate group is blocked in the resultant polyisocyanate.

The epoxy compound usable for pretreatment may be, for example, one or more of polyhydric alcohols such as ethylene glycol, glycerin, pentaerythritol and the like, reaction products obtained by reacting polyalkylene glycols such as polyethylene glycol and the like with halogen-containing epoxy compounds such as epichlorohydrin, and reaction products obtained by reacting polyhydric phenols such as resorcinol, bis (4-hydroxyphenyl) dimethyl-methane, phenol.formaldehyde resin, resorcinol.formaldehyde resin, and the like, with halogen-containing epoxy compounds. The above epoxy compound can be used in mixture with an organic solvent such as toluene, methyl ethyl ketone, or the like.

In the overcoat treatment, a rubber adhesive may be used which is prepared by dissolving an ethylene•α-olefin rubber composition in a solvent. Alternatively, a solution is used which is prepared by adding 5 to 30% by weight of carbon black to RFL consisting of ethylene•α-olefin elastomer latex. By using this overcoating, bond strength may be improved between the ethylene•α-olefin rubber composition and the fiber material.

The bonding rubber layers 14, 34 on the belts 10, 30 may be made from a rubber composition consisting of ethylene•α-olefin elastomer which has good heat resistance and which is vulcanizable with sulfur in order to improve bonding with the fiber material. As necessary, or if desired, the rubber composition may be mixed with a reinforcement material such as carbon black and silica, filler such as calcium carbonate and talc, plasticizers, stabilizers, processing aids, and colorants, which are commonly used in rubber compositions by those skilled in the art.

The amount of sulfur to be added to the bonding rubber layer 14, 34 may be in the range of 0.5 to 3.0 parts by weight, based on 100 parts by weight of the ethylene•α-olefin elastomer.

Of the ethylene•α-olefin elastomers used in the bonding rubber layers 14, 34, it is preferred that EPDM have an iodine value of more than 4 but less than 40. Iodine values of less than 4 may result in insufficient vulcanization of the rubber composition with the use of sulfur. This may cause popping out of the load carrying cords 16, 36. Conversely, iodine values of more than 40 may make the rubber composition susceptible to short scorching, resulting in potential inconvenient handling and poor heat resistance.

One exemplary process for producing a V-ribbed belt, such as that 10 in FIG. 1, is as follows. A single layer, or a plurality of canvas layers 22, 24 and a bonding rubber layer 14 are wound on a cylindrical molding drum. Load carrying cords 16 are spirally wrapped therearound, followed by the application of a compression rubber layer 18. The resulting subassembly is then vulcanized with sulfur or organic peroxide to produce a vulcanized sleeve.

The vulcanized sleeve can then be trained around driving and driven rollers and moved in an endless path at a selected speed under a desired tension. A rotating grinding wheel can be pressed against the moving belt sleeve to grind 3 to 100 recesses on the surface of the compression rubber layer 18.

The vulcanized sleeve can then be disengaged from the driving and driven rollers and trained around a separate pair of driving and driven rollers. The sleeve may then be cut as it is moved in an endless path to a desired width with an appropriate cutter to produce individual V-ribbed belts 10.

The present invention will now be described with respect to specific samples of inventive belts and comparative examples.

Inventive Samples 1–and
Comparative Examples 1–3

Untreated cords made from polyethylene terephthalate (PET) and arranged to be 100 dtex/2×3 were prepared and immersed in a pretreating solution, shown in Table 1, below.

TABLE 1

| Formulation Chemicals | Formulation Parts |
|---|---|
| polymeric isocyanate | 10 |
| toluene | 90 |
| total | 100 |

After being heat treated at 180° C. for 4 minutes, each cord was immersed in RFL as shown in Table 2, below, and heat treated at 230° C. for 2 minutes.

TABLE 2

| Formulation Chemicals | RFL-1 | RFL-2 |
|---|---|---|
| EPDM latex (solid content 40%) (diene content of EPDM polymer 10%) | 244.0 | — |
| EPDM latex (solid content 40% (diene content of EPDM polymer 13%) | — | 244.0 |
| resorcinol | 11.0 | 11.0 |
| 37% formalin | 16.2 | 16.2 |
| sodium hydroxide | 0.3 | 0.3 |
| water | 299.5 | 299.5 |
| Total | 571.0 | 571.0 |

Thereafter, the cord was immersed in overcoat treating solution, as shown in Table 3, below, followed by heat treatment at 150° C. for 4 minutes.

TABLE 3

| | Comparative Example | Inventive Sample | | | Comparative Example | Inventive Sample | | | |
|---|---|---|---|---|---|---|---|---|---|
| | 1 | 2 | 1 | 2 | 3 | 3 | 4 | 5 | 6 | 7 |
| kind of cord | PET 1100dtex/2 × 3 | | | | | | | | | |
| pretreating solution | Table 1 | | | | | | | | | |
| RFL | RFL-1 | | | | | RFL-2 | | | | |
| overcoat treating solution | absent | OC-1 | OC-2 | OC-3 | OC-4 | absent | OC-1 | OC-2 | OC-3 | OC-4 |
| diene content of latex polymer (wt %) | 10 | 10 | 10 | 10 | 10 | 13 | 13 | 13 | 13 | 13 |
| diene content of polymer of overcoat treating solution (wt %) | — | 4 | 6 | 10 | 13 | — | 4 | 6 | 10 | 13 |
| sum of diene content (wt %) | 10 | 14 | 16 | 20 | 23 | 13 | 17 | 19 | 23 | 26 |
| initial bond strength of belt (N) | 32 | 33 | 36 | 39 | 40 | 41 | 43 | 45 | 44 | 48 |
| residual bond strength of belt (N) | 12 | 20 | 26 | 30 | 31 | 20 | 28 | 32 | 35 | 36 |
| judgment *1 | X | X | ○ | ○ | ○ | X | ○ | ○ | ○ | ○ |

*1: As the criteria for identifying the residual bond strength of each belt, "more than 25 N" was judged by ○ and less than that value by X.

The overcoat treating solution shown in Table 3 was prepared by dissolving the rubber formulation of Table 4, below, in toluene.

TABLE 4

| Formulation No. | [part by weight] | | | |
|---|---|---|---|---|
| | OC-1 | OC-2 | OC-3 | OC-4 |
| Calculated diene content | 4 | 6 | 10 | 13 |
| EPDM polymer (diene content 13%) | — | 20 | 70 | 100 |
| EPDM polymer (diene content 4%) | 100 | 80 | 30 | — |
| Stearic acid | 0 | 0 | 0 | 0 |
| Zinc oxide | 5 | 5 | 5 | 5 |
| HAF carbon black | 40 | 40 | 40 | 40 |
| Hydrous silica | 15 | 15 | 15 | 15 |
| Vulcanization accelerator | 2 | 2 | 2 | 2 |
| Sulfur | 1 | 1 | 1 | 1 |

The resulting cord fiber material was used as a load carrying member in a power transmission belt.

Rubber, formulated as shown in Table 5, below, was used in the bonding rubber layers, with the rubber for the compression rubber layers prepared mixing the rubber in Table 5 with 15 parts by weight of nylon cut yarn or 5 parts by weight of aramid cut yarn.

TABLE 5

| Formulation Chemicals | Part by Weight |
|---|---|
| EPDM polymer | 100 |
| Stearic acid | 1 |
| Zinc oxide | 5 |
| HAF carbon black | 35 |
| Hydrous silica | 20 |
| Resorcinol.formalin copolymer | 2 |
| Anti-aging Agent | 2 |
| Vulcanization accelerator | 2 |
| Hexamethyoxymethylol melamine | 2 |
| Sulfur | 1 |

A 2-ply cotton canvas and a bonding rubber layer were laminated over a cylindrical molding drum. The load carrying cord was then applied at a pitch of 1.03 mm and under a tension of 50 N. The compression rubber layer was attached whereupon the resulting sleeve was vulcanized. The vulcanized sleeve that resulted was trained around driving and driven rollers and ground by rotating a wheel pressed against the compression rubber layer to produce recesses. The belt sleeve was then cut to desired widths to produce V-ribbed belts.

Figure 3:
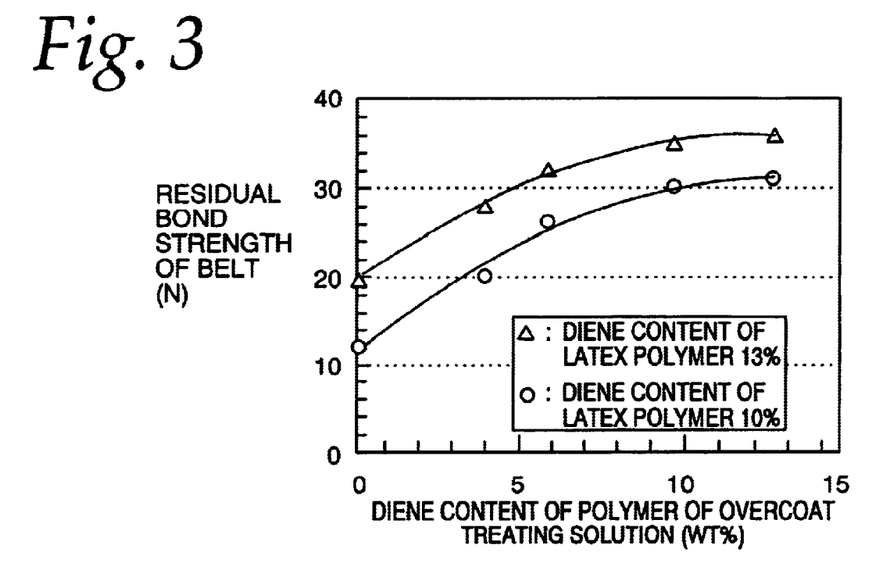
FIG. 3 is a graph showing the relationship between the diene content in an EPDM polymer of an overcoat treating solution for a fiber material used in belts and the residual bond strength of the belts.
Figure 4:
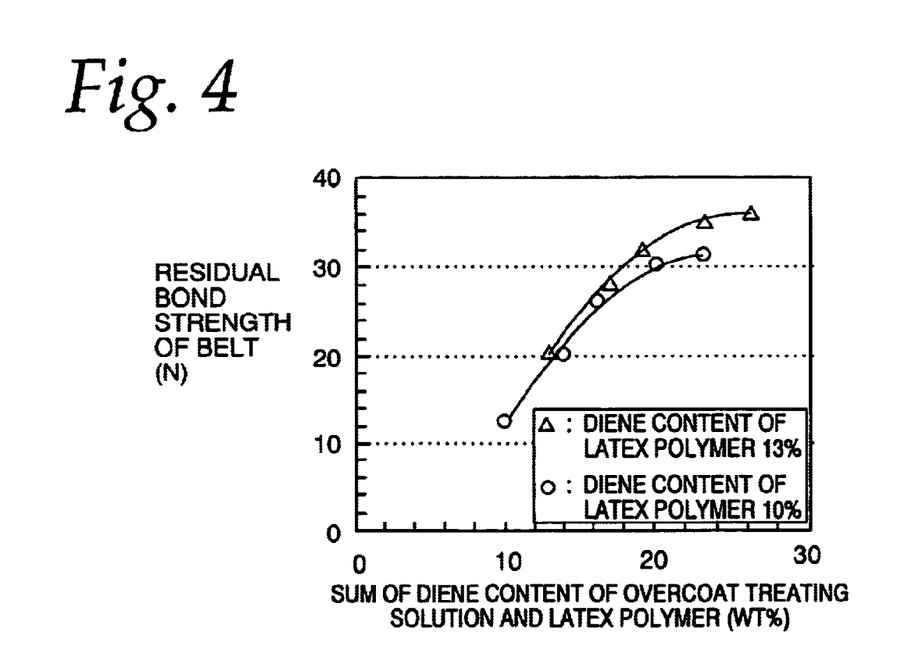
FIG. 4 is a graph showing the relationship between the sum of the diene content in an EPDM polymer of an overcoat treating solution and the diene content in a latex for treating a fiber material used in belts, and the residual bond strength of the belts.

The resulting V-ribbed belts were K3 type ribbed belts as stipulated by RMA with a rib pitch of 3.56 mm, a rib height of 2.0 mm, a belt thickness of 4.3 mm, and a rib angle of 40 degrees. The initial bond strength and residual bond strength of this belt were determined by the methods, described below, with the results shown in Table 3 and FIGS. 3 and 4. FIG. 3 shows the relationship between the diene content in an EPDM polymer of an overcoat treating solution and the residual bond strength of the belt. FIG. 4 shows the relationship between the sum of the diene content in an EPDM polymer of an overcoat treating solution and the diene content in a latex and the residual bond strength of the belt. In these figures, residual bond strength greater than 25 N was identified as "O", with those of less than 25 N identified as "X".

Comparative examples 1, 2 and 3, as described in Table 3, are examples which depart from the previously described, desired scope of numerical limitations, that being that the sum of the content of diene used in an ethylene•α-olefin rubber of a resorcinol-formalin-rubber latex and the content of diene used in the overcoat treating solution being at least 15%.

Initial Bond Strength

This bond strength denotes a stress value when two load carrying cords are raised and peeled at a rate of 50 mm/min.

Residual Belt Bond Strength

The belt was trained around a drive pulley, a driven pulley, and a tensioning pulley. The drive and driven pulleys had a diameter of 120 mm, with the tensioning pulley having a diameter of 45 mm. The bending angle of the belt on the tensioning pulley was approximately 90°. The belt was operated for 100 hours at an ambient temperature of 100° C., with the driving pulley operated at 4900 rpm with a load on the driven pulley of 8.8 kw and initial tension of the tensioning pulley at 834 N. The residual bond strength is a stress value identified during operation at which point two of the load carrying cords were raised and peeled at a rate of 50 mm/min.

It was found that the residual bond strength of the belt increases as the content of diene in the EPDM polymer of the overcoat treating solution is increased and that the initial bond strength and residual bond strength increase as the sum of the diene content in the EPDM polymer of RFL and the diene content in the EPDM polymer of the overcoat treating solution increases beyond 15% by weight.

Inventive Samples 8 and 9 and Comparative Example 4

Treatment was carried out using the same overcoat treating solution as for inventive sample 1, but with solid pickups changed. The initial bond strength and residual bond strength of each belt thus treated were determined by the measurement methods, indicated below.

The per meter weight (W1) of the cord that was overcoated and dried was measured and the per meter weight (W2) of the cord RFL treated and dried was measured. The solid pickup of the overcoat treating was expressed by the numerical value (%) that was derived by dividing the pickup (W1-W2) by W2. The results are shown in Table 6 and FIG. 5.

TABLE 6

| | Comparative Example 3 | Inventive Sample 8 | Inventive Sample 6 | Inventive Sample 9 | Comparative Example 4 |
|---|---|---|---|---|---|
| Kind of cord | | | PET 1100dtex/2 × 3 | | |
| Pretreating solution | | | Table 1 | | |
| RFL | | | RFL-2 | | |

TABLE 6-continued

| | Comparative Example 3 | Inventive Sample 8 | Inventive Sample 6 | Inventive Sample 9 | Comparative Example 4 |
|---|---|---|---|---|---|
| Overcoat treating solution | Absent | OC3 | | | |
| Solid pickup of overcoat treating solution | 0 | 3.0 | 8.0 | 11.1 | 13.3 |
| Initial bond strength of belt (N) | 41 | 43 | 44 | 44 | 40 |
| Residual bond strength of belt (N) | 20 | 32 | 35 | 33 | 24 |
| Judgement *1 | X | ○ | ○ | ○ | X |

*1: As the criteria for identifying the residual bond strength of each belt, "more than 25 N" was judged by ○ and less than that value by X.

Figure 5:
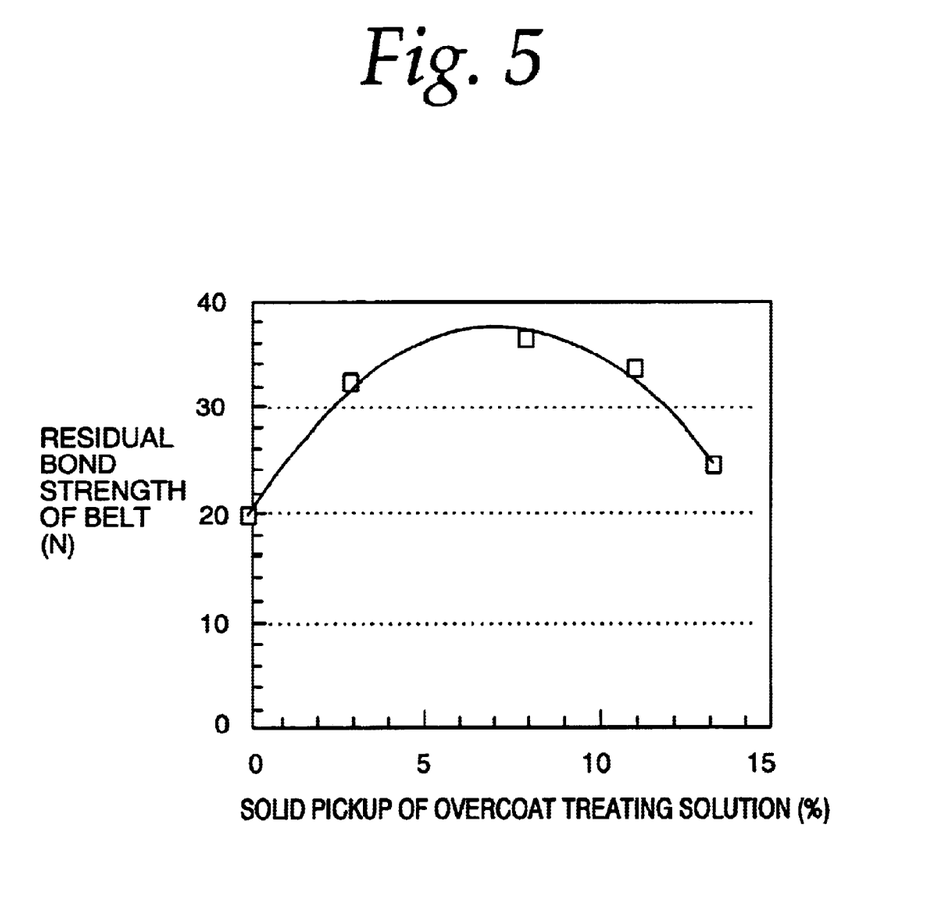
FIG. 5 is a graph showing the relationship between the solid pickup of an overcoat treating solution for fiber material used in belts and the residual bond strength of the belts.

FIG. 5 shows the relationship between the solid pickup of an overcoat treating solution and residual bond strength of a belt.

Comparative example 4 in Table 6 is a comparison with a solid pickup of the overcoat treating solution falling outside of the scope of the desired numerical range of 1–12% by weight.

It was found that the residual bond strength of the belt was reduced when the solid pickup of the overcoat treating solution was less than 1% by weight or greater than 12% by weight.

Additional testing was carried out with respect to inventive samples 10–12 and comparative examples 5–7.

Untreated cords were prepared made from nylon, aramid, and polyethylene terephthalate (PET), as shown in Table 7 below.

TABLE 7

| | Inventive Sample 10 | Inventive Sample 11 | Inventive Sample 12 | Comparative Example 5 | Comparative Example 6 | Comparative Example 7 |
|---|---|---|---|---|---|---|
| Kind of Cord | Nylon 6,6 1400dtex/1 × 5 | Kevlar 1670dtex/1 × 4 | PET 1100dtex/2 × 3 | | | |
| Predipping Treatment | no | yes | yes | yes | yes | yes |
| RFL treatment | RFL-1 | RFL-1 | RFL-1 | RFL-2 | RFL-3 | RFL-4 |
| Flat peel strength (N/25 mm) | 400 | 380 | 410 | 120 | 80 | 90 |

The aramid and PET fiber materials were immersed in a predipping solution as shown in Table 8, below, followed by heat treatment at 180° C. for 4 minutes.

TABLE 8

| Formulation Chemicals | Formulation Parts |
|---|---|
| polymeric isocyanate | 10 |
| toluene | 90 |
| Total | 100 |

Heat treatment was further carried out at 230° C. for 2 minutes after immersion in RFL, as shown in Table 9, below.

TABLE 9

| Formulation Chemicals | RFL-1 | RFL-2 | RFL-3 | RFL-4 |
|---|---|---|---|---|
| EPDM latex (solid content 40%) | 244.0 | — | — | — |
| JSR0652 (solid content 40%) | — | 244.0 | — | — |
| LV-60 (solid content 60%) | — | — | 162.7 | — |
| Nipol 1571 (solid content 40%) | — | — | — | 244.0 |
| Resorcinol | 11.0 | 11.0 | 11.0 | 11.0 |
| 37% Formalin | 16.2 | 16.2 | 16.2 | 16.2 |
| Sodium hydroxide | 0.3 | 0.3 | 0.3 | 0.3 |
| Water | 299.5 | 299.5 | 383.8 | 299.5 |
| Total | 571.0 | 571.0 | 571.0 | 571.0 |

The cords were arranged in parallel on a 4 mm thick rubber sheet, made as show in Table 10, below, and vulcanized for 30 minutes at 163° C. at a pressure of 0.2 MPa loaded with a pressing plate to produce samples for peel testing. Flat peeling strength was then determined in accordance with JIS (Japanese Industrial Standards) K6256, with the results shown in Table 7.

TABLE 10

| Formulation Chemicals | Formulation Parts |
|---|---|
| EPDM Polymer | 100 |
| Stearic acid | 0.5 |
| Zinc oxide | 5 |
| HAF Carbon black | 40 |
| Paraffin oil | 15 |
| Hydrous silica | 15 |
| Vulcanization accelerator | 2 |
| Sulfur | 1 |

The cords treated with RFL consisting of an ethylene•α-olefin elastomer latex had superior bond strength.

Inventive Samples 13–17 and Comparative Examples 8–10

Untreated cords made from of PET and formed to be 1100 dtex/2×3 were prepared, followed by immersion in a pre-dipping solution shown in Table 8, and by subsequent heat treatment at 180° C. for 4 minutes. Further heat treatment was carried out at 230° C. for 2 minutes after immersion in RFL shown in Table 11, below.

TABLE 11

|  | Comparative Example 8 RFL-5 | Inventive Sample 13 RFL-6 | Inventive Sample 14 RFL-7 | Inventive Sample 15 RFL-8 | Comparative Example 9 RFL-9 | Comparative Example 10 RFL-10 | Inventive Sample 16 RFL-11 | Inventive Sample 17 RFL-12 |
|---|---|---|---|---|---|---|---|---|
| Molar ratio of R/F | 1/3 | 1/2 | 1/1 | 2/1 | 3/1 | 1/1 | 1/1 | 1/1 |
| Mass ratio of RF/L | 1/4 | 1/4 | 1/4 | 1/4 | 1/4 | 1/10 | 1/8 | 1/2 |
| Concentration of RFL | 20 | 20 | 20 | 20 | 20 | 20 | 20 | 20 |
| EPDM latex | 199.4 | 199.3 | 199.1 | 199.0 | 199.0 | 226.8 | 221.7 | 165.5 |
| Resorcinol | 11.0 | 12.9 | 15.6 | 17.5 | 18.2 | 7.1 | 8.7 | 26.0 |
| 37% Formalin | 24.2 | 19.0 | 11.5 | 6.5 | 4.5 | 5.2 | 6.4 | 19.1 |
| Sodium hydroxide | 0.3 | 0.4 | 0.4 | 0.5 | 0.5 | 0.2 | 0.2 | 0.7 |
| Water | 265.1 | 268.4 | 273.4 | 276.5 | 277.8 | 260.7 | 263.0 | 288.7 |
| Total | 500.0 | 500.0 | 500.0 | 500.0 | 500.0 | 500.0 | 500.0 | 500.0 |
| Flat peel strength (N/25 mm) | — | 410 | 420 | 360 | 250 | 230 | 320 | 410 |

The treated cords were placed in parallel on a 4 mm thick rubber sheet, formulated as in Table 10, and then vulcanized for 30 minutes at 163° C. and at a pressure of 0.2 MPa loaded with a pressing plate, to produce samples for a peel test. Flat peeling strength was determined in accordance with JIS K6256, with the results shown in Table 11.

Comparative Examples 13 and 14, listed in Table 11, had a molar ratio of resorcinol to formalin outside the previously described, desired numerical range of from 1:2 to 2:1, whereas comparative example 15 had a mass ratio of resorcinol-formalin precondensate to rubber latex in the overall solid content outside the previously described, desired numerical range of 1:2 to 1:8.

Figure 6:
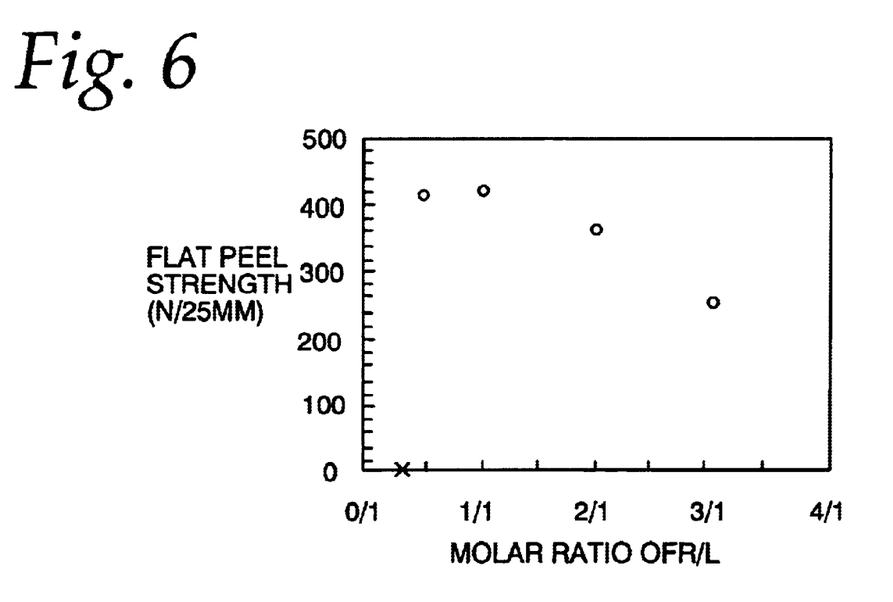
FIG. 6 is a graph showing the relationship between the mass ratio of resorcinol and formalin in a treating solution for fiber material used in belts and the flat peel strength.

In the case of RFL-5 (comparative example 8), with a molar ratio of R/L=1/3, bonding treatment was not possible because of gelation of the RFL. FIG. 6 represents the relationship between the molar ratio of R/L and the flat peel strength for the belts. From these results it can be seen that a molar ratio of R/L=3/1 is responsible for poor bonding. A range of R/L=1/2 to 2/1 results in superior bonding.

Figure 7:
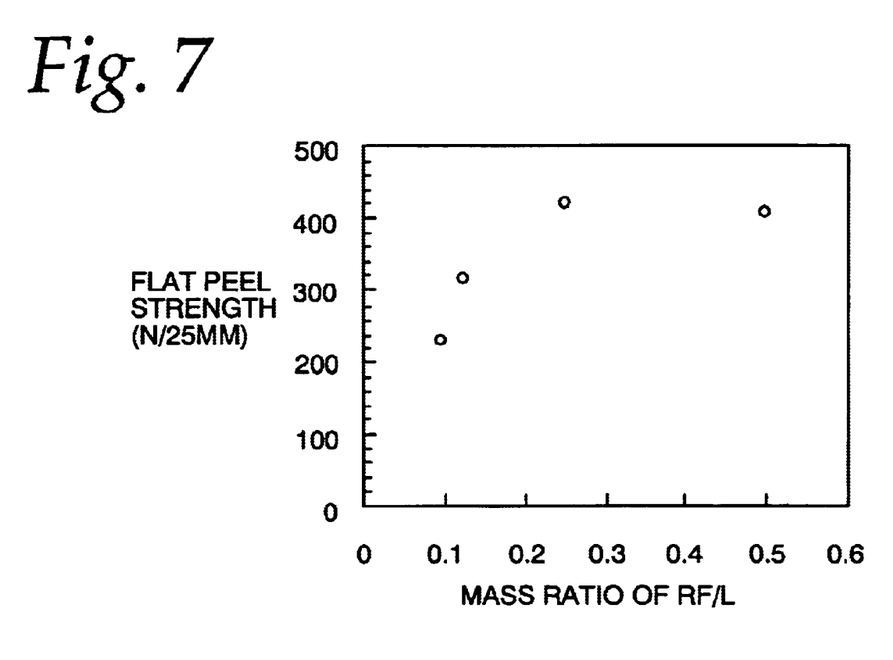
FIG. 7 is a graph showing the relationship between the mass ratio of resorcinol and formalin in latex used in treating fiber material in belts and the flat peel strength.

FIG. 7 represents the relationship between the mass ratio of RF/solid content of L and the flat peel strength. This demonstrates that a ratio of RF/L of 1/10 causes a decline in bonding strength.

Inventive Examples 18 and 19, Comparative Examples 11–13, and Reference Example Untreated cords made of PET and formed to be 1100 dtex/2×3 were prepared and immersed in a pre-dipping solution shown in Table 8, followed by heat treatment at 180° C. for 4 minutes. After immersion in RFL (RFL-7), heat treatment was carried out at 230° C. for 2 minutes. Successive immersion was carried out in an overcoating solution shown in Table 12, below, followed by heat treatment carried out at 150° C. for 4 minutes.

TABLE 12

| Formulation Chemicals | RFL-13 | RFL-14 | RFL-15 |
|---|---|---|---|
| Mass of carbon/mass of RFL | 1/9 | 1/3 | 1/2 |
| Mass ratio of carbon | 10 | 25 | 33 |
| EPDM latex (solid content 40%) | 244.0 | 244.0 | 244.0 |
| Resorcinol | 11.0 | 11.0 | 11.0 |
| 37% Formalin | 16.2 | 16.2 | 16.2 |
| Sodium Hydroxide | 0.3 | 0.3 | 0.3 |
| Water | 311.8 | 336.6 | 355.2 |
| Carbon Dispersion (25%) | 51.1 | 153.2 | 229.8 |
| Total | 634.4 | 761.3 | 856.5 |

A rubber adhesive, shown in Table 13, below, was prepared by dissolving the rubber formulated as shown in Table 10 and by setting the rubber concentration at 10%, in toluene.

TABLE 13

|  | Reference Example | Inventive Sample 18 | Inventive Sample 19 | Comparative Example 11 | Comparative Example 12 | Comparative Example 13 |
|---|---|---|---|---|---|---|
| Predipping Treatment | yes | yes | yes | yes | yes | yes |
| RFL treatment | RFL-7 | RFL-7 | RFL-7 | RFL-7 | RFL-7 | RFL-7 |
| Overcoating | rubber adhesive | RFL-13 | RFL-14 | RFL-15 | RFL-7 | — |
| Flat Peel Strength (N/25 mm) Original | 420 | 410 | 390 | 320 | 400 | 420 |
| after lapse of 6 months | 410 | 380 | 380 | 320 | 220 | 200 |

Figure 8:
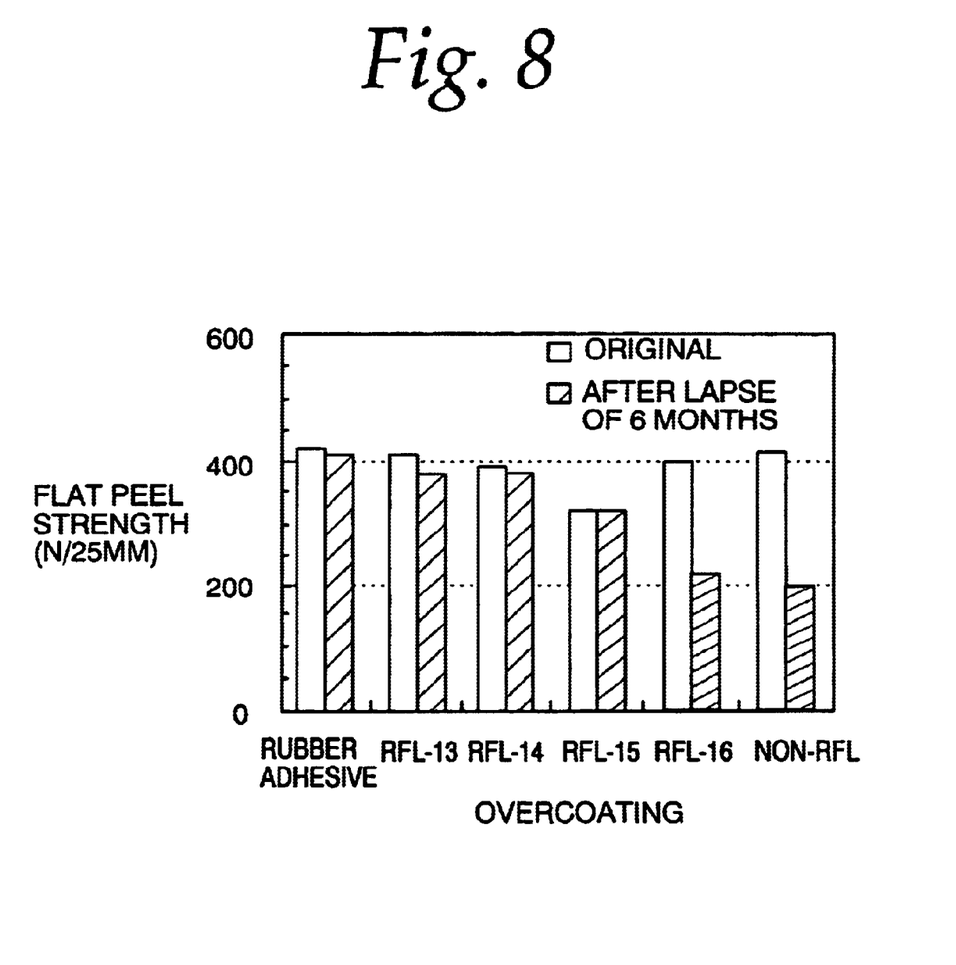
FIG. 8 is a graph showing the relationship between the types of overcoating treatment and peel strength for fiber material in a power transmission belt for various inventive samples and comparative examples.

The cords thus treated were placed in parallel on a 4 mm-thick rubber sheet formulated as shown in Table 11, and then vulcanized for 30 minutes at 163° C. and at a pressure of 0.2 MPa loaded with a pressing plate, whereby samples were produced for a peeling test. Flat peeling strength was determined in accordance with JIS K6256. As a further test, the treated cords were stored at 40° C. for six months and sampled for peel strength in the same manner as mentioned above. Flat peel strength was determined, with the results shown in Table 13, and in FIG. 8.

Comparative examples 11–13 in Table 13 had a weight of carbon black added to a resorcinol-formalin-rubber latex for overcoat treatment outside the previously described, preferred numerical range of 5–30%.

Cords overcoat treated with a rubber adhesive carbon black containing RFL were found to have superior bonding stability over time. When the mass ratio of carbon black relative to the overall solid content was lower than 5% by weight, bonding became poorer after a lapse of time. With the mass ratio of carbon black higher than 30% by weight, bond strength tended to reduce slightly.

The foregoing disclosure of specific embodiments is intended to be illustrative of the broad concepts comprehended by the invention.

What is claimed is:

1. A power transmission belt comprising:
   a body having a length,
   the body comprising an elastomeric material and a fiber material with an overcoat treating solution thereon,
   the fiber material extending lengthwise of the belt body,
   the elastomeric material comprising an unvulcanized ethylene•α-olefin rubber composition, and
   the overcoat treating solution comprising resorcinol-formalin-rubber latex and ethylene•α-olefin elastomer latex.

2. The power transmission belt according to claim 1 wherein the fiber material comprises a load carrying element.

3. The power transmission belt according to claim 2 wherein the fiber material comprises a load carrying cord.

4. The power transmission belt according to claim 1 wherein the fiber material is embedded in a rubber layer comprising an ethylene•α-olefin elastomer.

5. The power transmission belt according to claim 4 wherein the fiber material is overcoat treated with an unvulcanized ethylene•α-olefin rubber composition in a solvent.

6. The power transmission belt according to claim 5 wherein the sum of the diene content in ethylene•α-olefin rubber used for the resorcinol-formalin-rubber latex and the diene content in ethylene•α-olefin rubber used for the rubber adhesive solution is not less than 15% by weight.

7. The power transmission belt according to claim 1 wherein the ethylene•α-olefin rubber composition comprises at least one of a) a rubber derivable from an ethylene-propylene-diene monomer and b) ethylene-propylene rubber.

8. The power transmission belt according to claim 1 wherein the fiber material comprises at least one of a) polyester fiber, b) polyethylene terephthalate fiber, and c) polyethylene naphthalate fiber.

* * * * *